United States Patent
Barsness et al.

(10) Patent No.: US 9,886,485 B2
(45) Date of Patent: Feb. 6, 2018

(54) REDUCING REDUNDANT OPERATIONS IN A STREAMING ENVIRONMENT

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/644,398

(22) Filed: Mar. 11, 2015

(65) Prior Publication Data

US 2016/0267197 A1    Sep. 15, 2016

(51) Int. Cl.
*G06F 17/30* (2006.01)

(52) U.S. Cl.
CPC .............. *G06F 17/30516* (2013.01)

(58) Field of Classification Search
USPC ............................................... 707/790, 798
See application file for complete search history.

(56) References Cited

U.S. PATENT DOCUMENTS

| | | | |
|---|---|---|---|
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,108,394 B2* | 1/2012 | Johnson | H04L 43/022 707/737 |
| 8,296,331 B2* | 10/2012 | Chkodrov | G06F 17/30463 707/756 |
| 8,359,347 B2 | 1/2013 | Branson et al. | |
| 8,386,466 B2* | 2/2013 | Park | G06F 17/30368 707/713 |
| 8,560,526 B2 | 10/2013 | Santosuosso et al. | |
| 8,601,458 B2 | 12/2013 | Andrade et al. | |
| 9,298,849 B2 | 3/2016 | Cao et al. | |
| 9,723,045 B2 | 8/2017 | Chen et al. | |
| 2012/0218268 A1 | 8/2012 | Accola et al. | |
| 2014/0280128 A1* | 9/2014 | Branson | G06F 17/30516 707/736 |
| 2014/0280895 A1* | 9/2014 | Branson | H04L 65/60 709/224 |
| 2014/0317304 A1* | 10/2014 | Branson | H04L 65/60 709/231 |

(Continued)

OTHER PUBLICATIONS

Ballard et al., "IBM InfoSphere Streams: Harnessing Data in Motion," Sep. 2010, 360 pages, IBM Redbooks http://www.redbooks.ibm.com/abstracts/sg247865.html.

(Continued)

*Primary Examiner* — Kim Nguyen
(74) *Attorney, Agent, or Firm* — Robert J. Shatto

(57) ABSTRACT

A stream computing application may permit one or more jobs to connect to a data stream of a different job. As more jobs connect to the data stream, the likelihood that two or more operators are performing redundant operations on a data stream may increase. A stream manager may monitor an operator graph to identify two operators performing a redundant operation. If the stream manager determines that there are redundant operators in the operator graph, the stream manager may modify the operator graph to remove the redundant operators.

2 Claims, 12 Drawing Sheets

(56) References Cited

U.S. PATENT DOCUMENTS

| | | | | |
|---|---|---|---|---|
| 2014/0317305 A1* | 10/2014 | Branson | ............... | H04L 65/602 |
| | | | | 709/231 |
| 2014/0373019 A1* | 12/2014 | Branson | ............ | G06F 17/30943 |
| | | | | 718/102 |
| 2015/0066051 A1* | 3/2015 | Kwon | ....................... | B25J 3/04 |
| | | | | 606/130 |

OTHER PUBLICATIONS

Hirzel et al., "A Catalog of Stream Processing Optimizations," ACM Computing Surveys (CSUR), Apr. 2014, 30 pages, vol. 46, Issue 4, Article No. 46, ACM © 2014, New York, NY DOI: 10.1145/2528412.

Tavakoli et al., "On-line Sensing Task Optimization for Shared Sensors," IPSN '10: Proceedings of the 9th ACM/IEEE International Conference on Information Processing in Sensor Networks, Apr. 2010, pp. 47-57, ACM © 2010, New York, NY ISBN: 978-1-60558-988-6 DOI: 10.1145/1791212.1791219.

Barsness et al., "Reducing Redundant Operations in a Streaming Environment," U.S. Appl. No. 14/736,540, filed Jun. 11, 2015.

List of IBM Patents or Patent Applications Treated as Related.

\* cited by examiner

REDUCING REDUNDANT OPERATIONS IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present disclosure include a method for modifying an operator graph to remove duplicate operations from a stream computing application. A stream manager may monitor the operator graph to identify two operators performing a redundant operation. If the stream manager determines that there are redundant operators in the operator graph, the stream manager may modify the operator graph so that only one operator performs the redundant operation. The operator selected to perform the redundant operation may connect to other operators or jobs, and the redundant operators may be removed from the operator graph. Additional embodiments of the present disclosure are directed to a system and a computer program product for modifying an operator graph to remove duplicate operations.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
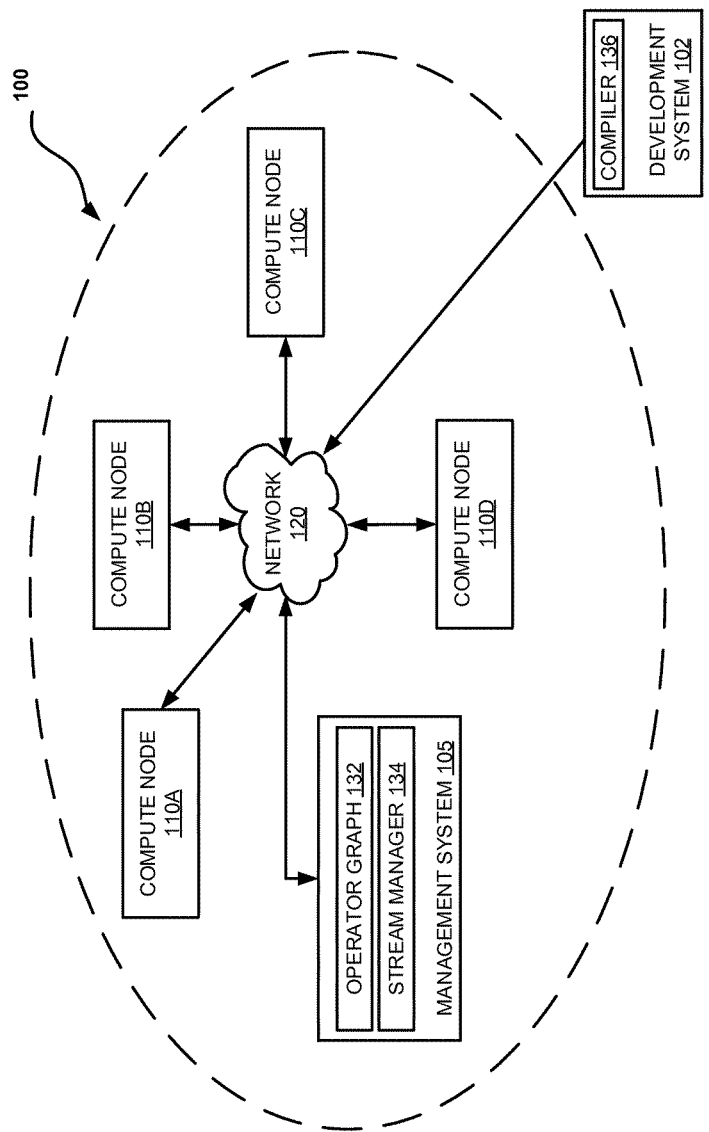
FIG. 1 illustrates a computing infrastructure configured to execute a stream computing application, according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may identify a particular stream of data (e.g., a connection between processing elements or operators in the operator graph) as "exportable." A different job may then dynamically connect to the exportable data stream (i.e., import the data stream). This is referred to as a "dynamic connection" because both jobs are currently executing when they begin to share the data stream.

A processing element or stream operator may perform an operation that employs a windowing condition. A "window," as referred to in this description and the claims, is a logical container for tuples received by an input port of a stream operator. Conceptually, a stream may be considered a pseudo-infinite sequence of tuples. A windowing condition may allow for the creation of subsets or groups of tuples within a stream, allowing a stream operator to perform an operation on a group of tuples instead of a single tuple. As an example, an aggregate stream operator supports windowing by default. However, a stream operator may not necessarily support windowing by default. A stream operator may, however, be configured to support windowing.

A window may be a tumbling or sliding window. A tumbling window may be specified by an eviction policy. When the eviction policy for a tumbling window is met, the stream operator executes operator logic on the tuples currently in the window and then empties the window. With respect to a tumbling window, the "conclusion" of a windowing condition, in this description and the claims, may refer to when the eviction policy for a tumbling window is met. The eviction policy of a tumbling window may be based on a count of tuples, a time interval, a delta, or punctuation. A delta is a difference between an attribute of an oldest tuple and a newest tuple. For example, a windowing condition may compare timestamps. Processing and eviction may be triggered when a time difference exceeds a specified value. A punctuation is a control signal that appears interleaved with the tuples in a stream. Punctuation appears in the data flow and may, for example, notify a stream operator of the grouping of tuples to be processed.

In contrast to a tumbling window, a sliding window does not automatically flush the window when the window is full. Once a window is full, a sliding window expels the oldest tuple when a new tuple arrives to replace it. In this way, a sliding window maintains the size of the window. A sliding window may be specified by an eviction policy and a trigger policy. The eviction policy of a sliding window may be based on a count of tuples, a time interval, or an attribute delta. The trigger policy specifies when the stream operator executes operator logic on the tuples currently in the window. The trigger policy may be based on a count of tuples, a time interval, or an attribute delta. The eviction and trigger policies are independent of one another. With respect to a sliding window, the "conclusion" of a windowing condition, as used in this description and the claims, may refer to when the trigger condition of a sliding window is met.

The phrase "windowing conditions," as used in this description and the claims, may include the conditions used to describe eviction and trigger policies. A stream operator that includes a windowing condition may be referred to, in this description and the claims, as a windowing operator. Windowing may be specified in any number of ways. For example, an application programmer may define one or more specific windowing conditions. Additionally, the system may provide a set of windowing conditions.

As used herein, "redundant operations" are equivalent, or the same, operations, processes, or methods that are performed on a data stream by two or more operators. For example, if two operators sum a data stream, the summing is a redundant operation. "Redundant operators" are two or more operators that perform at least one redundant operation on a data stream. The redundant operators may be fully redundant, meaning they perform the exact same set of operations on a data stream. For example, if two operators aggregate a data stream and for every 30 tuples received output a sum of the data, they are fully redundant. Redundant operators may also be partially redundant, which means that they share some common calculations or processes. For example, if a first operator aggregates a data stream and outputs a sum for every 30 tuples received, and a second operator aggregates the equivalent data stream and outputs a sum for every 60 tuples received, the operators would be partially redundant operators. As used herein, "equivalent data streams" are a data streams being output by the same operator, even if they go to different downstream operators.

An "intermediary operator" is an operator that may be added to an operator graph when redundant operators are found to perform the redundant operations. For example, if two operators are fully redundant, an intermediary operator would perform the same operations as the redundant operators. If, however, two operators are partially redundant, the intermediary operator may perform only the operations common or necessary for both redundant operators. For example, assume a first operator aggregates tuples from two data streams for 30 seconds and then performs a sort operation on the data, and a second operator aggregates the data from the same two data streams for 30 seconds and sums the data. An intermediary operator may be added that performs only the redundant operation, in this case aggregating the data for 30 seconds, and then the intermediary operator may transmit the data to both the first and second operators so that they can perform the sort and sum operations, respectively. A "deployed job" is a job that runs when the stream computing instance is initiated.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
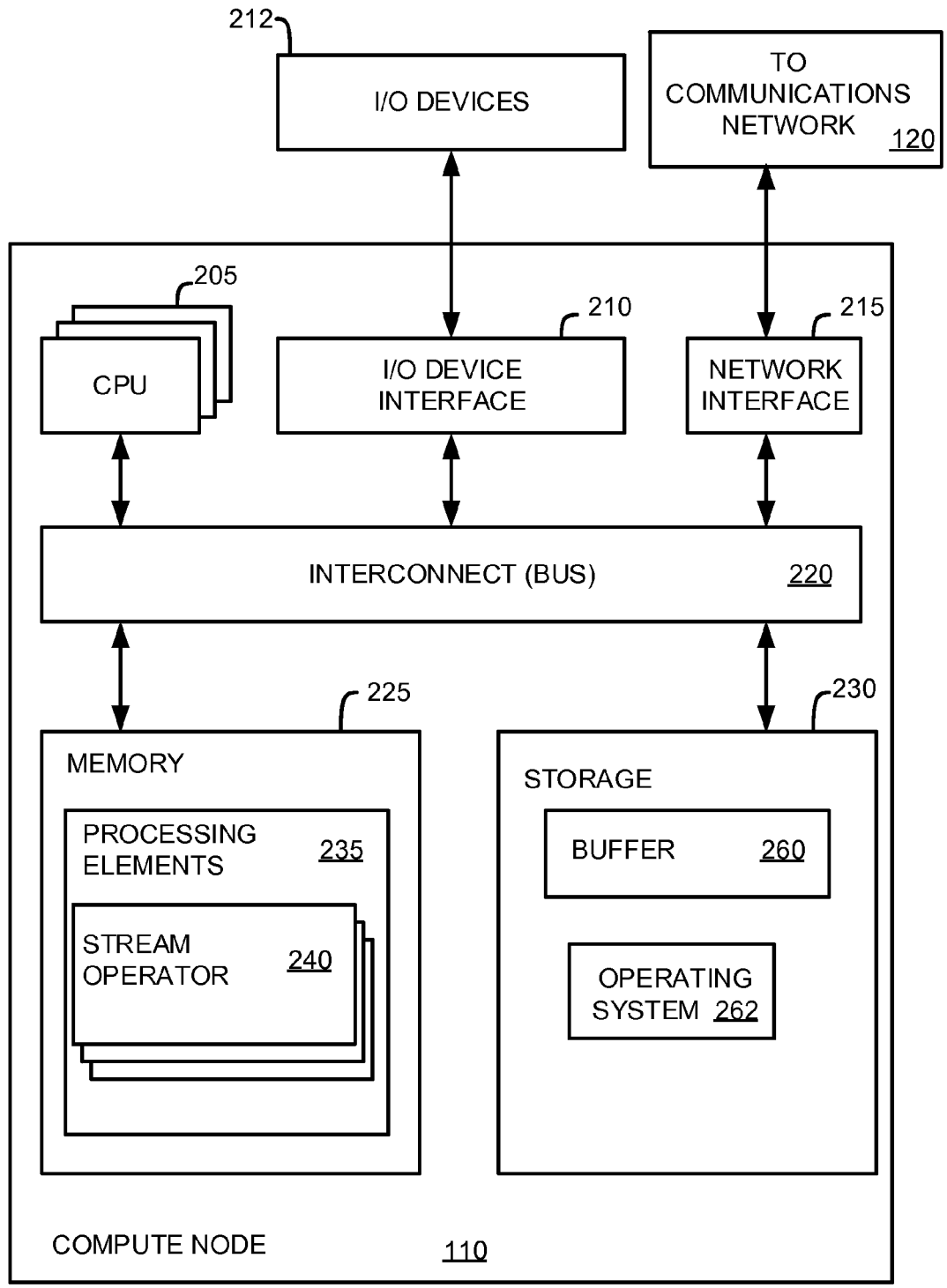
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM) or Dynamic Random Access Memory (DRAM). The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
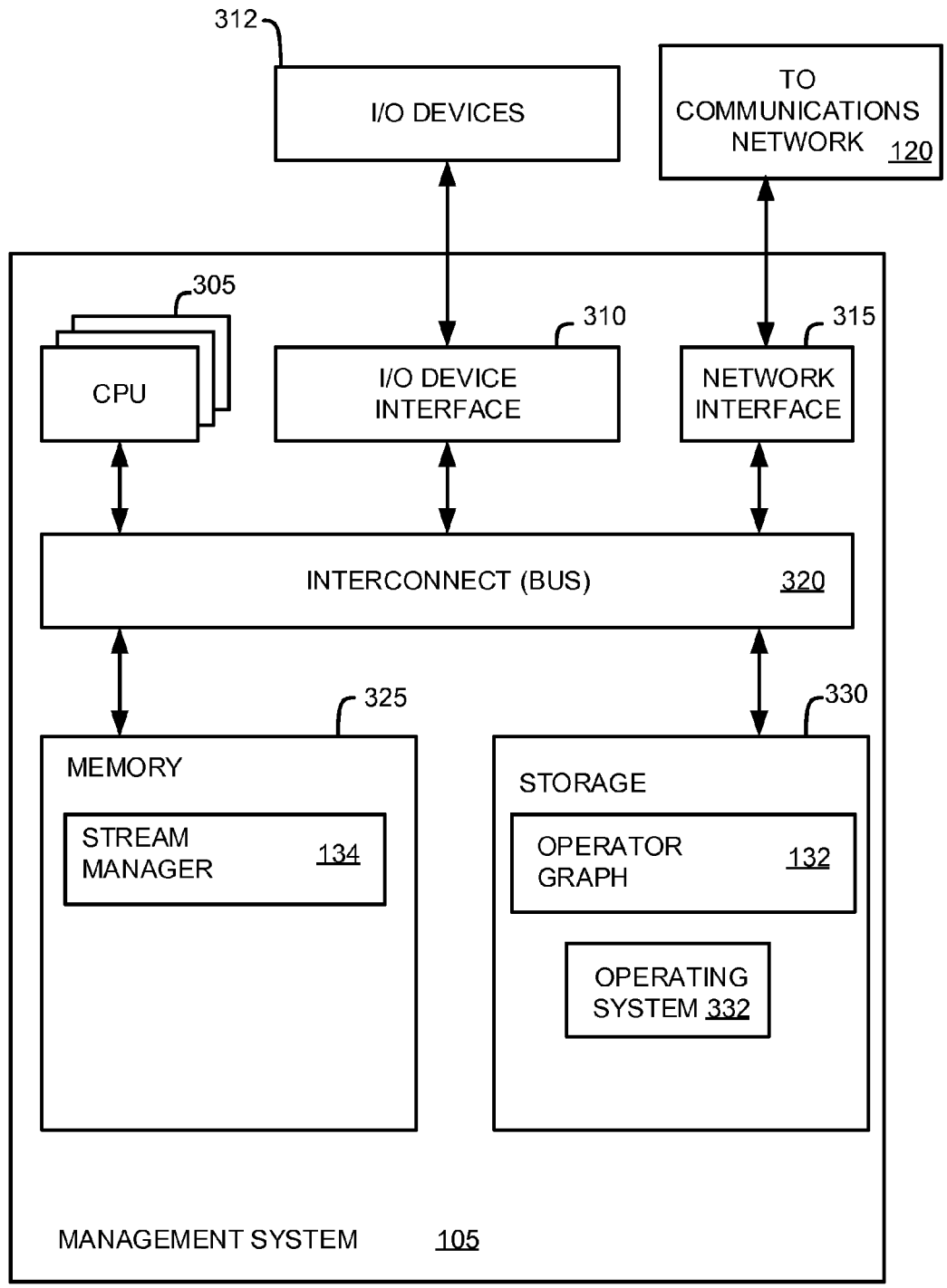
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
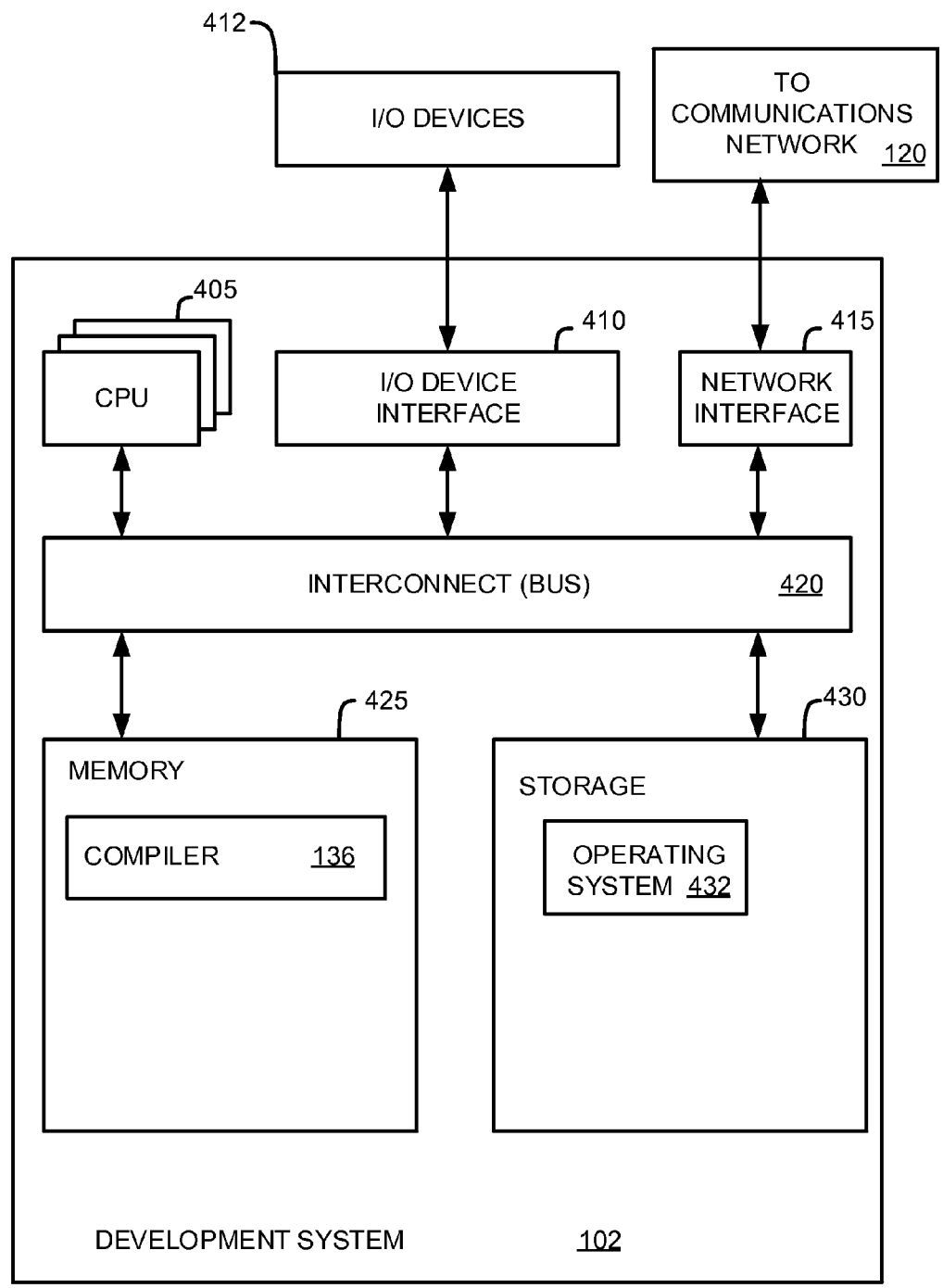
FIG. 4 illustrates a more detailed view of the development system of FIG. 1, according to various embodiments.

FIG. 4 is a more detailed view of the development system 102 of FIG. 1, according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which can include source code or statements, into the object code, which may include machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
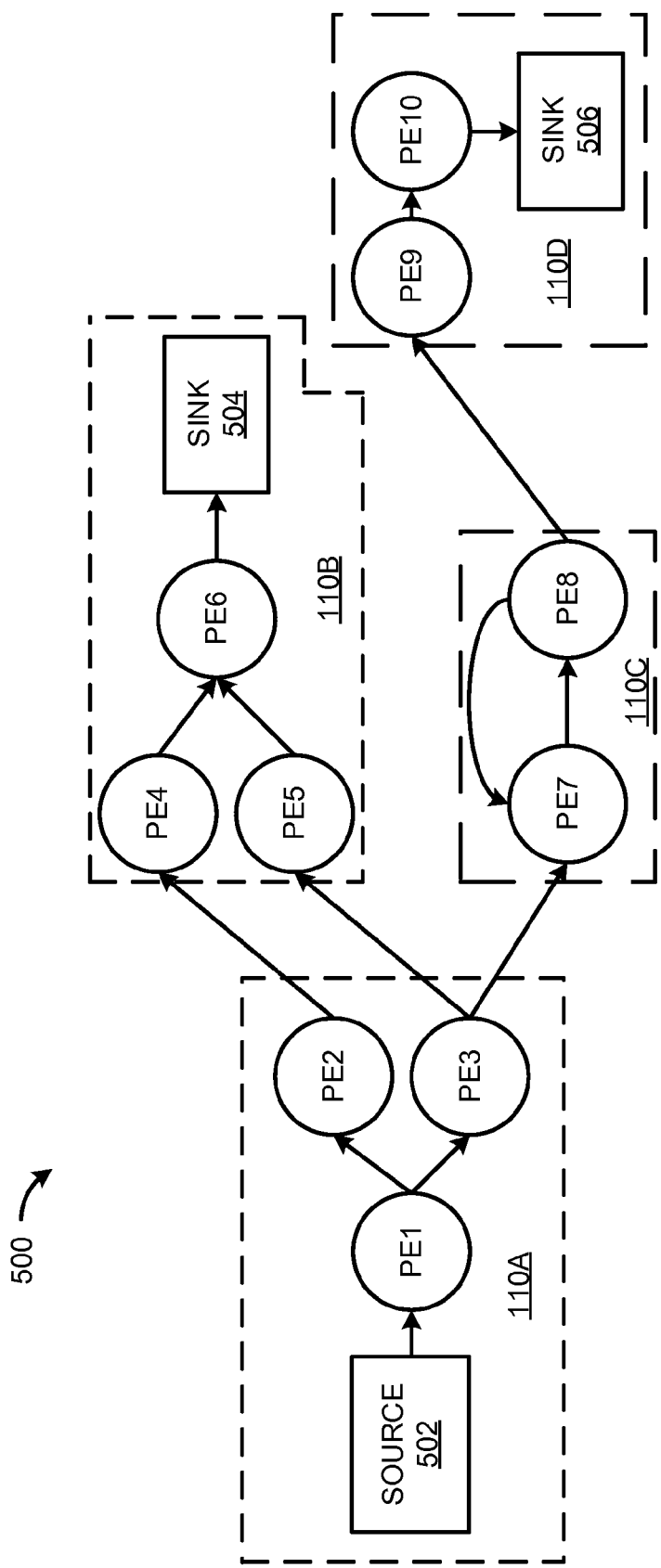
FIG. 5 illustrates an operator graph for a stream computing application, according to various embodiments.

FIG. 5 illustrates an exemplary operator graph 500 for a stream computing application beginning from one or more sources 502 and ending at one or more sinks 504, 506, according to some embodiments. This flow from source to sink may be referred to herein as an execution path. In addition, a flow from one processing element to another may also be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 and then to sink 504. Similarly, tuples flowing from PE3 to PE5 also reach the sink 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6A:
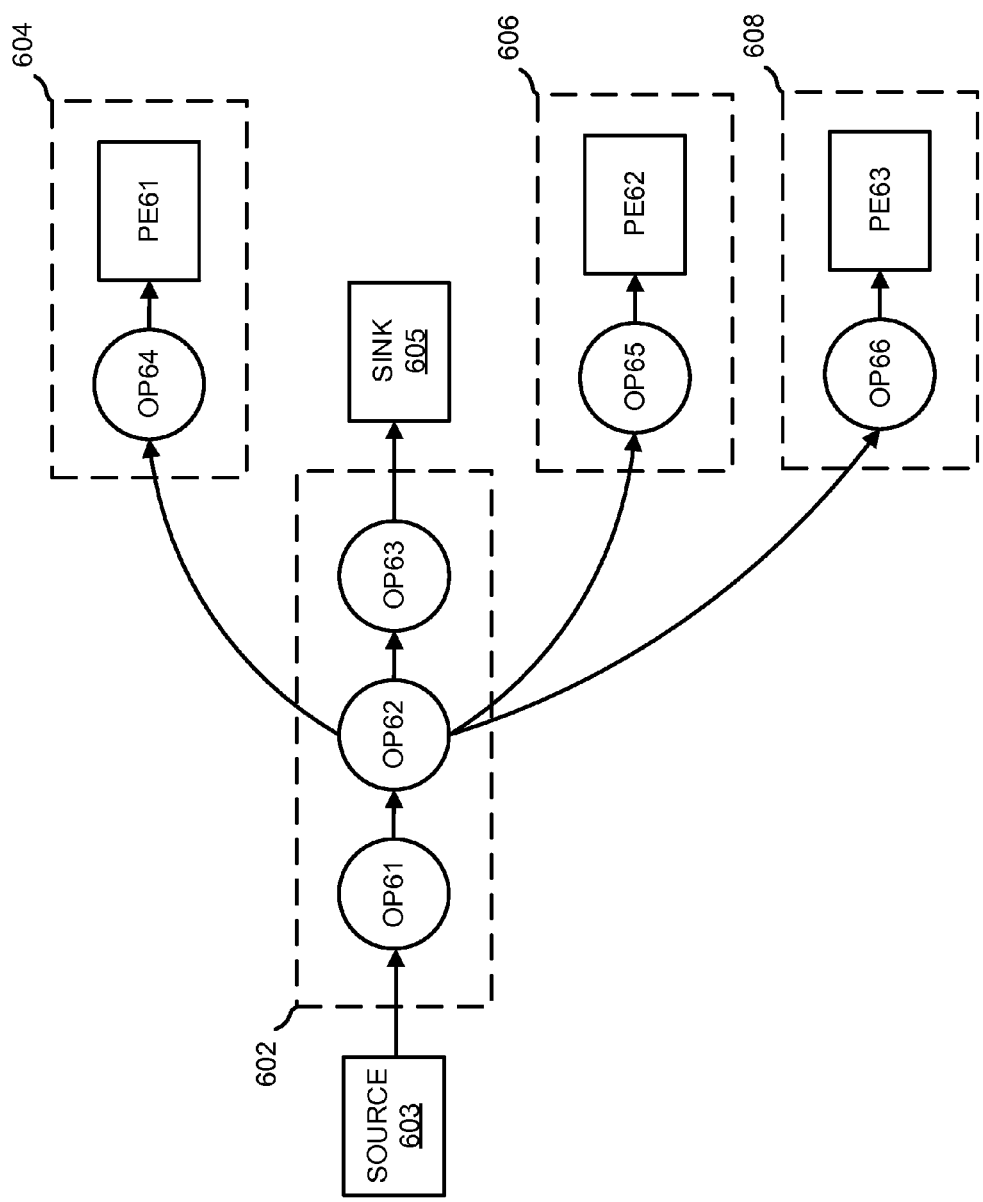
FIG. 6A illustrates an example of an operator graph of a stream computing application in which illustrative embodiments of the present disclosure may be implemented.

Referring now to FIG. 6A, shown is an example of an operator graph of a stream computing application in which illustrative embodiments of the present disclosure may be implemented. In this example, stock trading at an exchange is tracked in real time.

The stream computing application may include a first job 602, a second job 604, a third job 606, and a fourth job 608, as well as a source 603 and a sink 605. The first job 602 may be a deployed job, while the second, third, and fourth jobs may be connected jobs (i.e., jobs that are dynamically connected to the first job). The first job 602 may comprise three operators OP61-63. The first operator OP61 may import trading information, e.g., the number of shares of a particular publicly traded company purchased and sold on an exchange, in real time from the source 603. The second operator OP62 may extract information pertaining to trades (e.g. purchases and sales) made by a particular stock trader (e.g., an individual or company), and the third operator OP63 may save a log of the trades in a database. While the first job 602 may be used to track a stock trader's activity in real time, other jobs may want access to the trading information. For example, someone may want to keep track of how many trades the stock trader makes every 30 seconds to, e.g., compare the stock trader's activity to other stock traders.

To accommodate different uses of the data, the second operator OP62 may be made exportable to allow other jobs, e.g., the second job 604, the third job 606, and the fourth job 608, to dynamically connect to the second operator OP62. Each dynamically connected job 604, 606, and 608, may have an operator that imports a data stream from the second operator OP62, performs an operation on the data, and then outputs a new data stream to a processing element, where additional operations may be performed. For example, the second job 604 may include a fourth operator OP64 and a first processing element PE61; the third job 606 may include a fifth operator OP65 and a second processing element PE62; and, the fourth job 608 may include a sixth operator OP66 and a third processing element PE63.

Figure 6B:
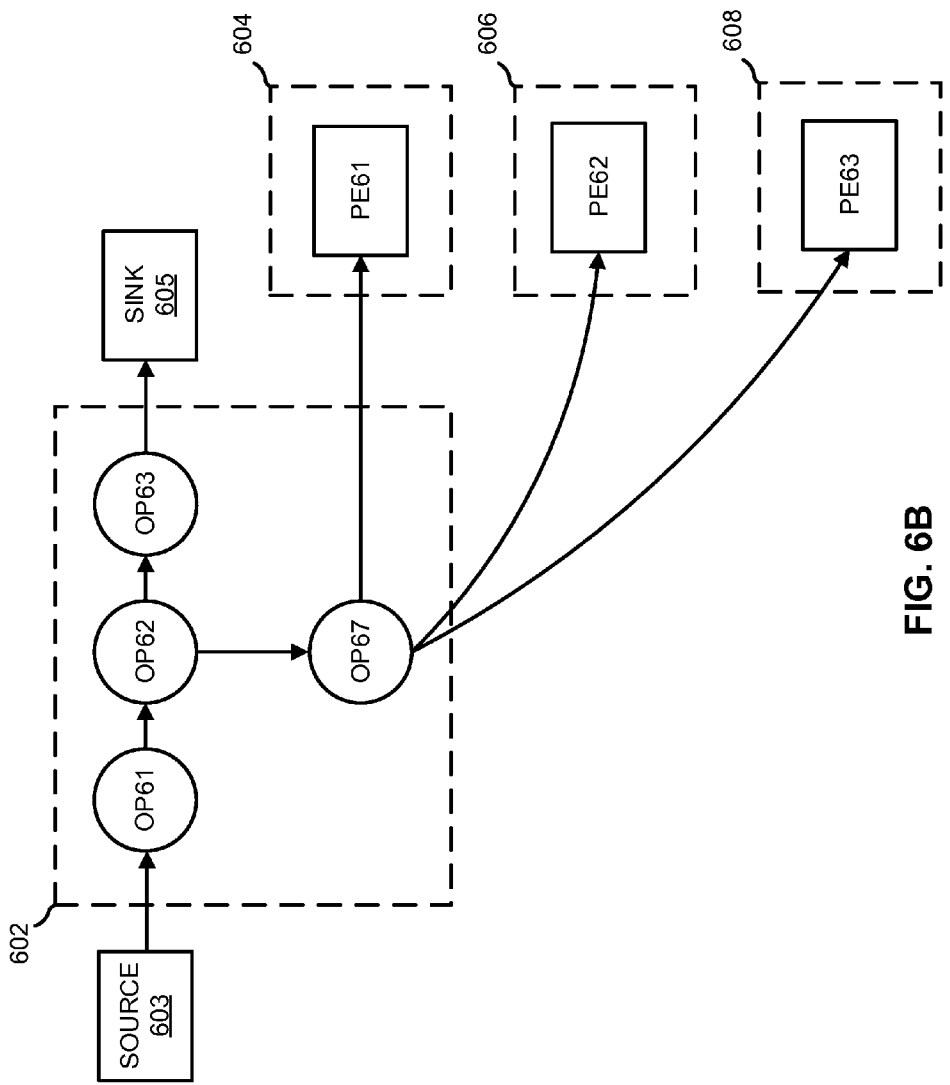
FIG. 6B illustrates an example operator graph of the stream computing application of FIG. 6A after the stream manager has removed redundant operators, in accordance with embodiments of the present disclosure.
Figure 6C:
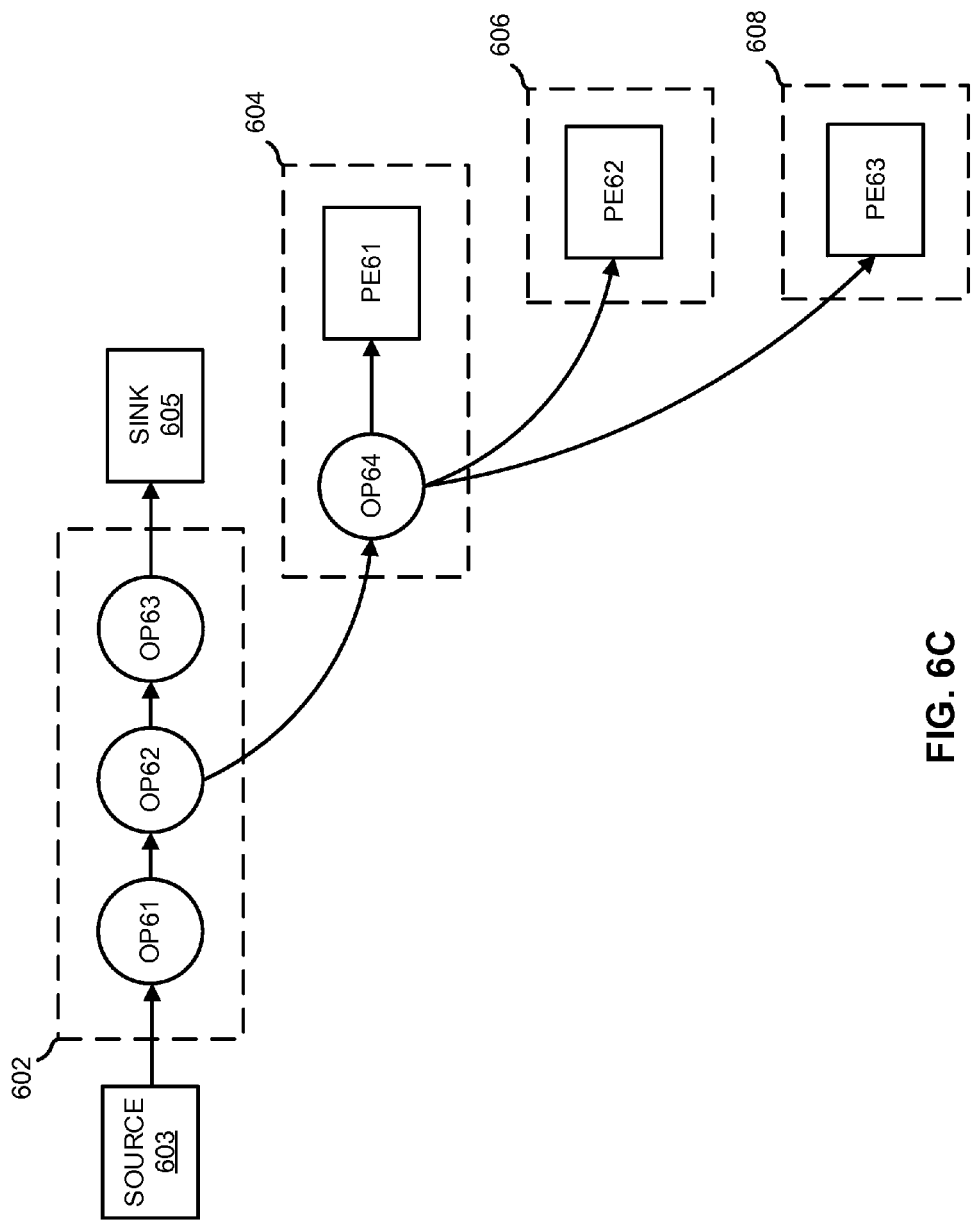
FIG. 6C illustrates an alternative example operator graph of the stream computing application of FIG. 6A after the stream manager has removed redundant operators, in accordance with embodiments of the present disclosure.

Occasionally, the addition of dynamically connected jobs may result in two or more operators importing a data stream and performing a redundant operation on the data it receives. In some embodiments, these operators may be fully redundant in that they perform exactly the same operations to the data. In other embodiments, the operators may be partially redundant, meaning that some of the operations performed by the operators are the same. FIGS. 6A-C illustrate an example of a stream computing application with fully redundant operators. An example of an operator graph with partially redundant operators is discussed in reference to FIGS. 7A-C. In embodiments of the disclosure, when two or more operators are performing a redundant operation, the stream manager 134 (shown in FIG. 1) may modify the operator graph to remove the redundancies.

For example, the fourth operator OP64, the fifth operator OP65, and the sixth operator OP66 in FIG. 6A may all perform the exact same task, i.e., be fully redundant. They could be, e.g., aggregate operators. Aggregate operators aggregate data according to their windowing conditions and then sum the aggregation information. Using the stock trading example, all three operators may be aggregate operators that aggregate the data received from the second operator OP62 for 30 seconds, and then the operators may sum the data to determine the total number of trades made by the stock trader over those 30 seconds. This may be an inefficient way for the stream computing application to operate because there are three operators temporarily saving the same data to three memories, and then performing the same operations on the data. In various embodiments, the stream manager may determine that two operators are fully redundant by determining that each operator includes a windowing condition of the same type, e.g., tumbling or sliding, that the windowing conditions for each operator includes the same eviction and trigger policies, and that the operator logic invoked by the respective trigger policies is identical. The stream manager may determine that two operators are fully redundant by comparing program code or instructions. Alternatively, the stream manager may determine that two operators are fully redundant by comparing predefined operator names and configuration parameters. In some embodiments, the stream manager may determine that two operators are fully redundant using a combination of these techniques.

Referring now to FIG. 6B, shown is an example operator graph of the stream computing application of FIG. 6A after the stream manager has removed redundant operators, in accordance with embodiments of the present disclosure. In order to remove redundancies, in some embodiments the stream manager may create an intermediary operator OP67 within the first job 602, and it may connect the intermediary operator OP67 to each job while bypassing the redundant operators. The intermediary operator OP67 may perform the exact same operations as the redundant operators, e.g., the fourth operator OP64, the fifth operator OP65, and the sixth operator OP66 shown in FIG. 6A.

After creating the intermediary operator OP67, the stream manager may establish a connection between it and the second operator OP62 so that the intermediary operator imports the same data that the redundant operators are importing, and the stream manager may make the intermediary operator OP67 exportable. After making the intermediary operator OP67 exportable, the stream manager may create execution paths between the intermediary operator OP67 and the connected jobs 604, 606, and 608. The execution paths may bypass the redundant operators, instead connecting directly to the downstream operators or processing elements of the jobs. For example, the execution path between the intermediary operator OP67 and the second job 604 may be connected to the first processing element PE61, bypassing the fourth operator OP64. After connecting the intermediary operator to each connected job, bypassing the redundant operators, the stream manager may remove the redundant operators, such as the fourth, fifth, and sixth operators OP64-66, from the operator graph.

Following the stock trading example from above, the stream manager may create an intermediary operator OP67 to aggregate the data it receives from the second operator OP62 for 30 seconds, and then sum up the data to determine the number of trades made by a specified stock trader. The intermediary operator OP67 may then transmit this sum directly to the processing elements PE61-63 of the connected jobs 604, 606, and 608, eliminating the need for each job to aggregate and sum the data itself. The stream manager may then remove the redundant operators from the operator graph, and the connected jobs may then process the data as they normally would.

Referring now to FIG. 6C, shown is an alternative example operator graph of the stream computing application of FIG. 6A after the stream manager has removed redundant operators, in accordance with embodiments of the present disclosure. Instead of using an intermediary operator as discussed in reference to FIG. 6B, in some embodiments, redundancies are removed from the operator graph by linking together, also referred to as daisy-chaining, the connected jobs.

For example, after the stream manager determines that the fourth operator OP64, the fifth operator OP65, and the sixth operator OP66 all perform the exact same operations on the data exported by the second operator OP62 (all shown in FIG. 6A), the stream manager may make one of the redundant operators, such as the fourth operator OP64, exportable. The stream manager may then connect the fourth operator OP64 to the third and fourth jobs 606 and 608, bypassing the redundant operators of each job, e.g., the fifth operator OP65 and the sixth operator OP66 respectively. For example, in order to connect the fourth operator OP64 to the third job 606, the stream manager may create an execution path between the fourth operator OP64 and the second processing element PE62, bypassing the fifth operator OP65, which is a fully redundant operator. After establishing a connection between the fourth operator OP64 and each connected job, bypassing the redundant operators in each of those jobs, the stream manager may remove the redundant operators, such as the fifth and sixth operators OP65-66, from the operator graph.

Following the stock trading example from above, the stream manager may choose one of the redundant operators from the connected jobs, such as the fourth operator OP64 from the second job 604, to make exportable. The fourth operator will continue to group and sum the stock trading data it receives from the second operator OP62 as it had been. Instead of only transmitting the sum to the first processing element PE61, however, the fourth operator OP64 will now also transmit the sum to the processing elements PE62 and PE63 of the third and fourth jobs, bypassing the redundant operator in each job. The stream manager may then remove the remaining redundant operators (OP65 and OP66) from the operator graph, and the connected jobs may process the data as they normally would.

When attaching the connected jobs to each other as shown in FIG. 6C, any of the redundant operators may be chosen as the exportable operator to be kept in the operator graph. In some embodiments, the stream manager may determine which redundant operator to make exportable based on which one connected first. In other embodiments, the stream manager may determine which operator to keep by comparing the performance of the redundant operators and choosing the one with the highest performance. For example, the stream manager may determine the rate at which the redundant operators are outputting tuples. The stream manager may then pick the fastest redundant operator as the exportable operator, and remove the other redundant operators from the operator graph.

As another example, the stream manager may monitor the nodes on which the redundant operators are deployed. The stream manager may monitor, e.g., the nodes' memory usage and CPU utilization. If a first node that runs a first redundant operator has a very high CPU utilization compared to the other nodes, the stream manager may determine that the stream application would benefit from removing operations, such as those performed by the first redundant operator, from the first node. Accordingly, the stream manager may choose a different redundant operator to make exportable and may remove the first redundant operator from the operator graph.

Figure 7A:
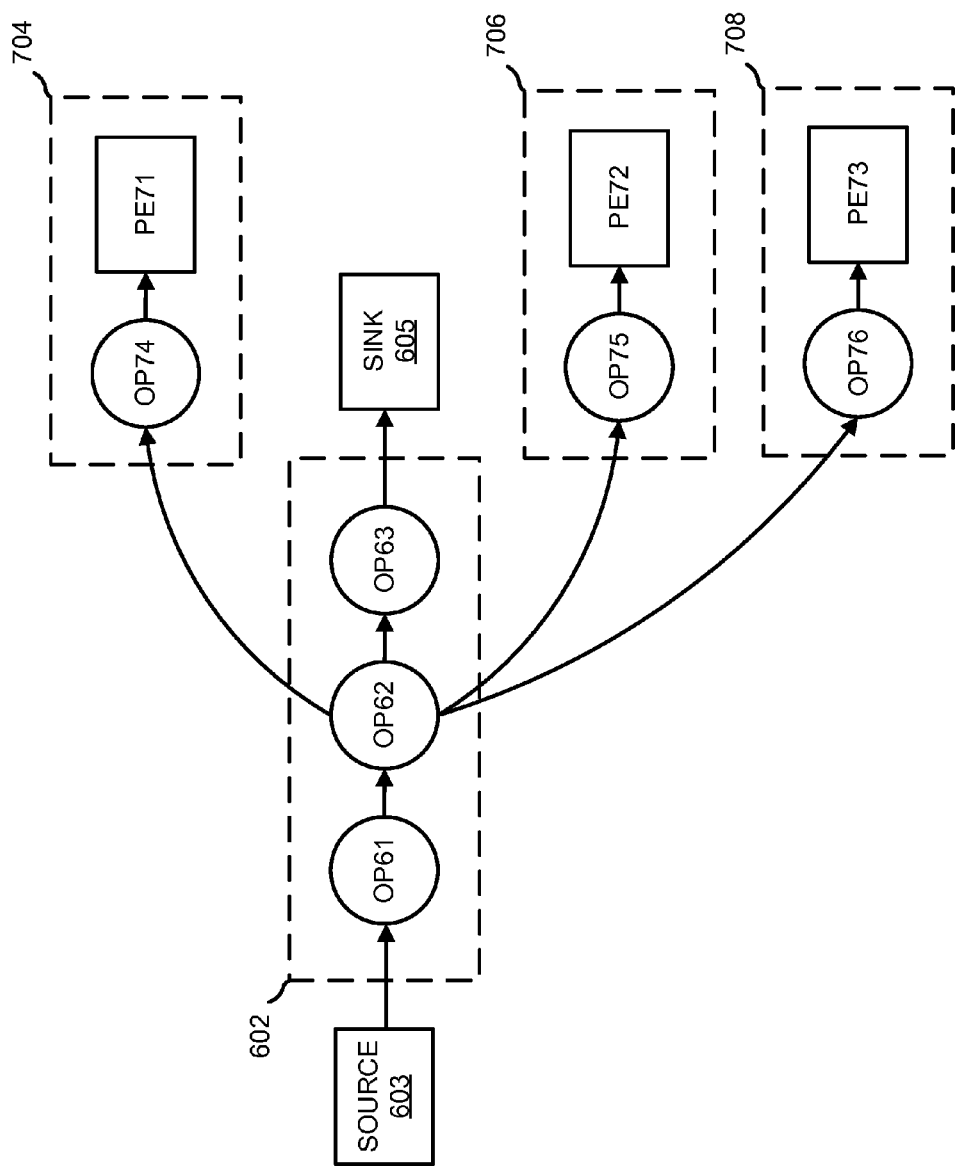
FIG. 7A, illustrates an alternative example of an operator graph of a stream computing application in which illustrative embodiments of the present disclosure may be implemented.

Referring now to FIG. 7A, shown is an alternative example of an operator graph of a stream computing application in which illustrative embodiments of the present disclosure may be implemented. Unlike the operator graph discussed in reference to FIG. 6A, the operator graph shown in FIG. 7A has partially redundant operators instead of fully redundant operators. Once again, the example given describes a situation where stock trading at an exchange is tracked in real time.

The stream computing application may include a first job 602, a second job 704, a third job 706, and a fourth job 708, as well as a source 603 and a sink 605. The first job 602 may be a deployed job, while the second, third, and fourth jobs may be connected jobs (i.e., jobs that are dynamically connected to the first job). The first job 602 is the same as the first job described in reference to FIG. 6A. As discussed in reference to FIG. 6A, the first job 602 may comprise three operators OP61-63. The first operator OP61 may import trading information in real time from the source 603, which may be, e.g., the number of shares of a particular publicly traded company purchased and sold on an exchange. The second operator OP62 may extract information pertaining to trades (e.g. purchases and sales) made by a particular trader (e.g., an individual or company), and the third operator OP63 may save a log of the trades in a database. The second operator OP62 may send out one tuple of information every second.

To accommodate different uses of the data, the second operator OP62 may be made exportable to allow other jobs, e.g., the second job 704, the third job 706, and the fourth job 708, to dynamically connect to the second operator OP62. Each dynamically connected job 704, 706, and 708, may have an operator that imports a data stream from the second operator OP62, performs an operation on the data, and then outputs a new data stream to a processing element, where additional operations may be performed. For example, the second job 704 may include a fourth operator OP74 and a first processing element PE71; the third job 706 may include a fifth operator OP75 and a second processing element PE72; and, the fourth job 708 may include a sixth operator OP76 and a third processing element PE73.

In this example, the fourth operator OP74, the fifth operator OP75, and the sixth operator OP76 may perform redundant operations to the data. For example, the fourth operator OP74 may group and sum the data every 30 seconds, i.e., it may determine how many trades the stock trader makes every 30 seconds. The fifth operator OP75 may group and sum the data every 60 seconds, and the sixth operator may group and sum the data every 90 seconds. What happens to the data after it is sent to the processing elements PE71-73 could be any one of a variety of different operations, but, for illustration, each processing element PE71-73 performs a different set of operations on the data they receive. In various embodiments, the stream manager may determine that two operators are partially redundant by determining that each operator includes a windowing condition of the same type, e.g., tumbling or sliding and that the windowing conditions for each operator includes the same eviction and trigger policies. In addition, the stream manager may determine that the operator logic invoked by the respective trigger policies is similar though not identical. For example, the stream manager may determine that the respective operator logic in first and second stream operators performs a function or operation that is identical but which may vary depending on a specified parameter or variable. The stream manager may further determine the parameter or variable is specified to have a different value in each of the first and second stream operators. The stream manager may make these determinations by comparing program code or instructions. Alternatively, the stream manager may make these determinations by comparing predefined operator names and configuration parameters. In some embodiments, the stream manager may make these determinations using a combination of these techniques.

Figure 7B:
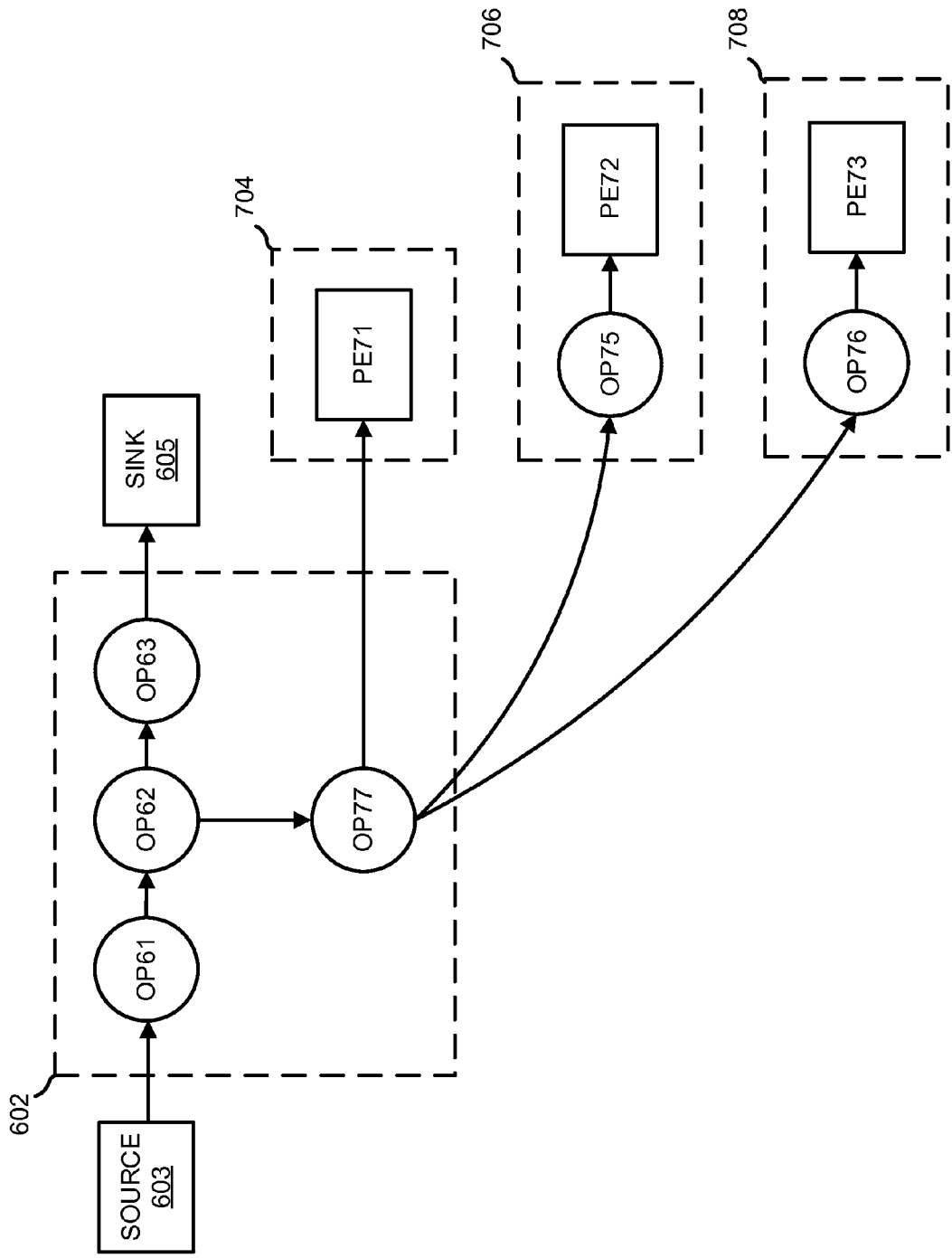
FIG. 7B illustrates an example operator graph of the stream computing application of FIG. 7A after the stream manager has removed redundant operators, in accordance with embodiments of the present disclosure.

Referring now to FIG. 7B, shown is an example operator graph of the stream computing application of FIG. 7A after the stream manager has removed redundant operators, in accordance with embodiments of the present disclosure. In order to remove redundancies, in some embodiments the stream manager may create an intermediary operator OP77 within the first job 602, and it may connect the intermediary operator OP77 to the connected jobs 704, 706, and 708. Because the operators OP74-76 are not fully redundant, the intermediary operator OP77 will not perform the exact same operations as all of the redundant operators. Instead, the intermediary operator OP77 will only perform the redundant operations common to each of the redundant operators.

After creating the intermediary operator OP77, the stream manager may connect it to the second operator OP62 so that the intermediary operator imports the same data that the redundant operators are importing. The stream manager may also make the intermediary operator OP77 exportable. After making the intermediary operator OP77 exportable, the stream manager may create execution paths between the intermediary operator OP77 and the connected jobs 704, 706, and 708. If the intermediary operator OP77 performs the same exact operations as one of the redundant operators, the execution paths may bypass that redundant operator and connect directly to the downstream operators or processing elements of the jobs. If not, each of the redundant operators may be modified so that it only performs the operations unique to it.

For example, using the stock trading example, the redundant operators OP74-76 group and sum the data, and the only difference is how often that is done. The fourth operator OP74 sums the data every 30 seconds, the fifth operator OP75 every 60 seconds, and the sixth operator OP76 every 90 seconds. Because 30, 60, and 90 have a common factor of 30, the stream manager may determine that it is possible for the intermediary operator OP77 to sum the data every 30 seconds, and transmit that sum to the redundant operators. Therefore, the stream operator may create an intermediary operator OP77 that groups and sums the data every 30 seconds (i.e., performs the same job as the fourth operator OP74).

The intermediary operator OP77 may then be connected to the second job 704, the third job 706, and the fourth job 708. Because the intermediary operator OP77 performs the exact same task as the fourth operator OP74, the intermediary operator OP77 may be directly connected to the first processing element PE71 of the second job 704 and the fourth operator OP74 may be removed from the operator graph. If the windowing conditions had been different, the stream manager may not have been able to bypass the fourth operator OP74. For example, if the windowing condition for the fifth operator had been 45 seconds (meaning that the three windows were 30 seconds, 45 seconds, and 60 seconds), the intermediary operator may have a window of 15 seconds (the greatest common factor of 30, 45, and 60). In this case, all three redundant operators OP74-76 may have been modified to connect to an intermediary operator OP77 with a window of 15 seconds.

The intermediary operator OP77 may not bypass the fifth operator OP75 and the sixth operator OP76 because the fifth and sixth operators have different windowing conditions than the intermediary operator OP77. Instead, the fifth operator OP75 and the sixth operator OP76 may need to be modified. For example, if the windowing conditions for the fifth and sixth operators were created to accept one tuple of data every second, to group and sum 60 and 90 tuples of data respectively, the fifth and sixth operators will need to be modified now that they are connected directly to the intermediary operator OP77, which only sends one tuple of data every 30 seconds. The stream manager may therefore change the fifth operator's OP75 windowing conditions so that it groups and sums the data every 2 tuples, and it may change the sixth operator's OP76 windowing conditions so that it groups and sums the data every 3 tuples. Instead of having to store 60 and 90 tuples of data in their operator memories, the fifth and sixth operators now only have to store 2 and 3 tuples respectively.

Figure 7C:
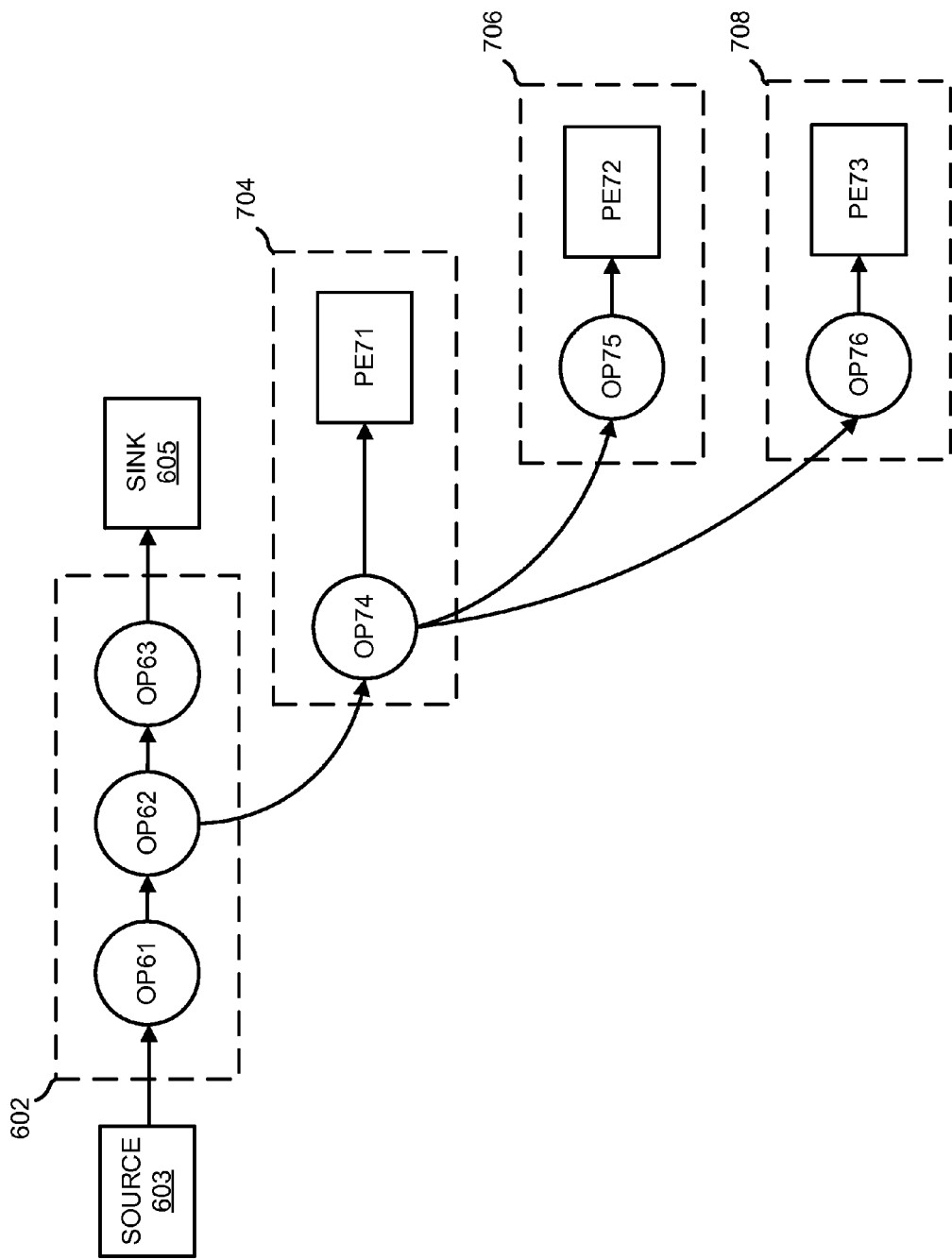
FIG. 7C illustrates an alternative example operator graph of the stream computing application of FIG. 7A after the stream manager has removed redundant operators, in accordance with embodiments of the present disclosure.

Referring now to FIG. 7C, shown is an alternative example operator graph of the stream computing application of FIG. 7A after the stream manager has removed redundant operators, in accordance with embodiments of the present disclosure. Instead of using an intermediary operator as discussed in reference to FIG. 7B, in some embodiments, redundancies are removed from the operator graph by linking together the connected jobs.

For example, after the stream manager determines that the fourth operator OP74, the fifth operator OP75, and the sixth operator OP76 all perform one or more partially redundant operations on the data exported by the second operator OP62 (all shown in FIG. 7A), the stream manager may make one of the redundant operators, such as the fourth operator OP74 exportable. The stream manager may then connect the fourth operator OP74 to the third and fourth jobs 706 and 708. If the fourth operator OP74 performs the same exact operations as one of the other redundant operators, the execution paths may bypass that redundant operator and connect directly to the downstream operators or processing elements of the jobs. If not, the redundant operator may be modified so that it only performs the operations unique to it.

Using the example described herein, the fourth, fifth, and sixth operators are only partially redundant. Therefore, in order to connect the fourth operator OP74 to the third job 706 and to the fourth job 708, the stream manager may create an execution path between the fourth operator OP74 and the partially redundant operators (the fifth operator OP75 and the sixth operator OP76). The stream manager may modify the fifth and sixth operators so that they are able to work with the data exported by the fourth operator OP75. Using the stock trading example, the fifth operator OP75 and the sixth operator OP76 may need to be modified as described in reference to FIG. 7B. That is to say, the windowing conditions of the fifth operator OP75 and the sixth operator OP76 may need to be adjusted now that they are receiving tuples every 30 seconds, as opposed to every second.

Figure 8:
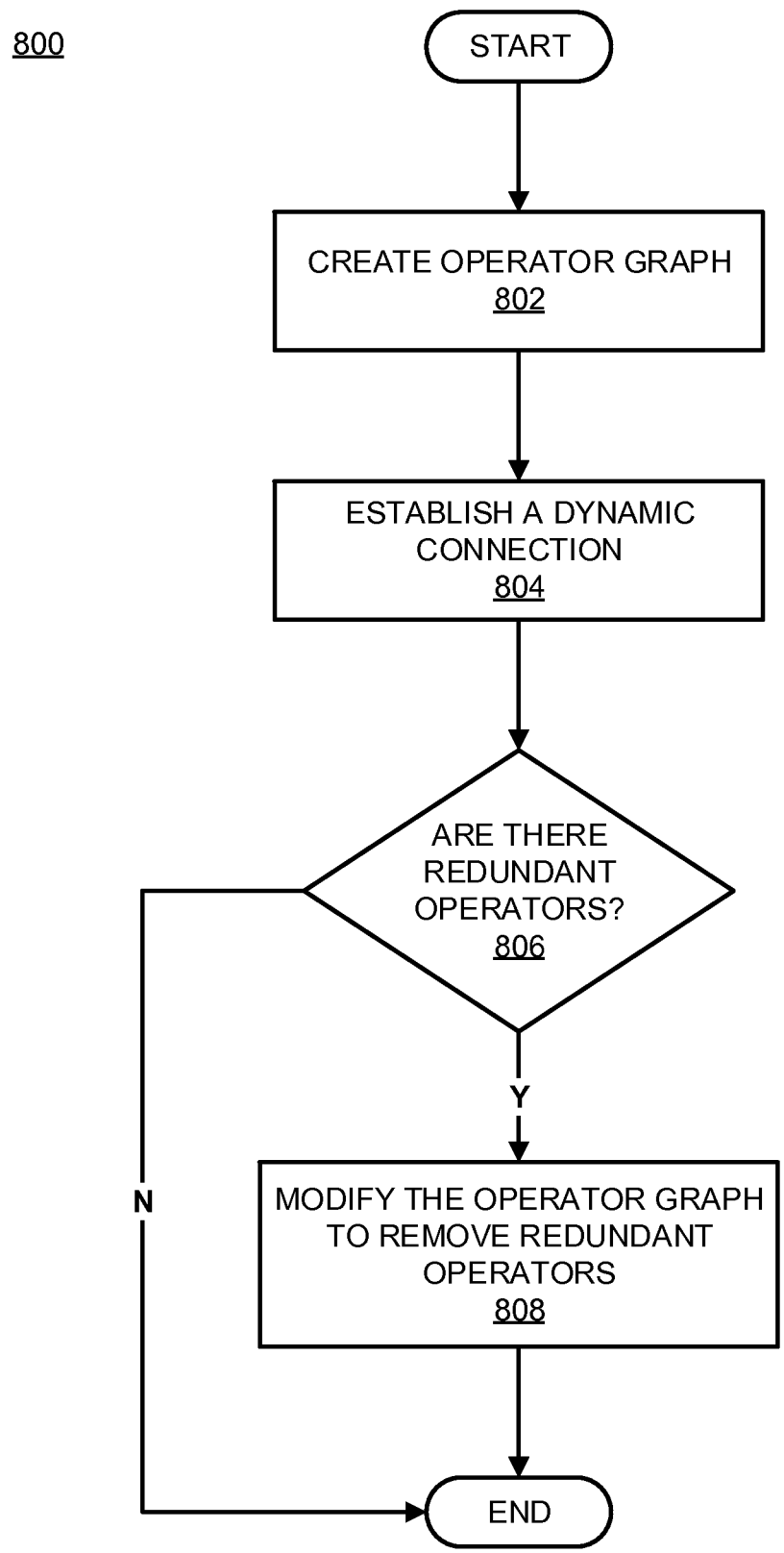
FIG. 8 is a flowchart illustrating a method for modifying an operator graph to remove redundant operations, in accordance with embodiments of the present disclosure.

Referring now to FIG. 8, shown is a flowchart of a computer-implemented method 800 for modifying an operator graph to remove redundant operators, in accordance with embodiments of the present disclosure. In some embodiments, the method 800 may be performed by a stream manager 134 (discussed in reference to FIG. 1). The method may begin at operation 802, where an operator graph of a stream computing application is created.

At operation 804, one or more dynamic connections may be made to an exportable operator. In response to a dynamic connection being made, at decision block 806 the stream manager may determine whether there are redundant operators in the operator graph. There are numerous ways in which the stream operator may determine that two or more operators are redundant.

For example, in some embodiments the stream manager may monitor the windowing conditions of two or more operators receiving tuples from the same upstream operator(s) to determine whether two or more operators are fully or partially redundant. This may be particularly advantageous if multiple operators are, e.g., aggregate operators that group and sum data where the only difference between them is their windowing conditions.

In other embodiments, the stream manager may monitor the tuples entering and exiting the operators to determine whether the tuples leaving two different operators consistently have identical schema and/or attributes. For example, two operators may import tuples from the same upstream operator(s), the tuples having an attribute comprising a string of text. Both operators may take the string of text and make it all uppercase and output tuples with an attribute consisting of the uppercase text. The stream manager may monitor the operators and determine that both operators are outputting tuples where the only changed attribute is that the string of text is being made uppercase, and therefore determine that the operators are redundant.

As another example, two operators may import tuples from an upstream operator where the tuples contain a temperature reading using the Fahrenheit scale. In monitoring the tuples being output by the two operators, the stream manager may determine that the operators are converting the temperature from degrees Fahrenheit to, e.g., degrees Celsius or to Kelvin. The stream manager may then conclude that that the two operators are performing a redundant operation.

In still other embodiments, the stream manager may determine that two or more operators are redundant by comparing what type of operator they are. For example, two or more operators may be delay operators. Delay operators are used to artificially slow down a stream of tuples. If the stream manager notices that two delay operators are importing the same data stream, and are configured to cause the same amount of delay, the stream manager may conclude that the operators are redundant and the operator graph can be modified.

As another example, two barrier operators may import the same set of data streams. Barrier operators are used to synchronize tuples from two or more streams. For example, assume that a first tuple from a data stream is sent to two operators so that two operations may be performed on that tuple in parallel. The first operator may perform a first operation on the first tuple and output a second tuple, and the second operator may perform a second operation on the first tuple and output a third tuple. In some circumstances, it may be beneficial to join the second and third tuples together. A barrier operator may be used to rejoin the tuples and output a single tuple of data that incorporates the operations performed by the first and second operator. The barrier operator may work even if the first and second operators perform their operations, and therefore output tuples, at different rates by holding on to a tuple received at one port until a corresponding tuple is received at a second port. If the stream manager determines that two barrier operators are importing data from the same two or more upstream operators and rejoining the tuples, the stream manager may conclude that the barrier operators are redundant.

If the stream manager is unable to identify any redundant operators, the method 800 may end. If, however, the stream manager identifies two or more redundant operators, the stream manager may modify the operator graph to remove the redundant operators per operation 808. As used herein, in some embodiments, removing redundant operators from an operator graph may include taking the redundant operators out of the operator graph. In other embodiments, removing redundant operators may include modifying the redundant operators so that they no longer perform redundant operations.

There are various techniques that may be used to remove redundant operators. In some embodiments, the stream manager may modify the operator graph by creating an intermediary operator to perform the redundant operations as discussed in reference to FIGS. 6B and 7B. The intermediary operator may be created within a job that also has an exportable operator, as was the case in FIGS. 6B and 7B. In other embodiments, the intermediary operator may be inserted into a separate job, or in to one of the dynamically connected jobs.

As previously discussed, the intermediary operator may be attached to each of the connected jobs that require the data. In some embodiments, particularly if the operators are fully redundant, the intermediary operator may bypass the redundant operators and connect downstream from the redundant operators in each job. The redundant operators may then be removed from the operator graph. An example of the stream manager modifying the operator graph in this fashion was previously discussed in reference to FIG. 6B.

In other embodiments, it may not be possible to bypass the redundant operators completely. In these cases, the intermediary operator may perform only the redundant operations. The stream manager may also modify the redundant operators so that they are capable of accepting the data stream from the intermediary operator. An example of the stream manager modifying the operator graph in this fashion was previously discussed in reference to FIG. 7B. In alternative embodiments, the stream manager may remove duplicate operators by making an operator within a connected job exportable. Other jobs may then connect to the operator within the connected job. Examples of jobs being daisy-chained in this fashion were shown and discussed in reference to FIGS. 6C and 7C.

In some embodiments, the redundant operations may be performed by a single operator or processing element. In other embodiments, the redundant operations may be performed by two or more linked operators. For example, a plurality of connected jobs may each have a first operator to take the sum of the data it receives, and a second operator to find the mean of the data. In these circumstances, the method 800 may be applied to a group of operators instead of to a single operator. For example, if the stream manager is set up to create intermediary operators to remove redundancies (as discussed more thoroughly in reference to FIGS. 6B and 7B herein), the stream manager may create two intermediary operators: a first intermediary operator to sum the data and a second intermediary operator to find the mean. The output from the second intermediary operator would then be sent to each of the plurality of jobs, and the stream manager would remove the first operator that sums the data and the second operator that finds the mean from each of the connected jobs.

After the stream manager modifies the operator graph per operation 808, the method 800 may end. Multiple embodiments of the method are described in detail herein. It is contemplated that some or all of the embodiments may be performed, individually or collectively, within a single operator graph. It is also anticipated that alterations and modification of the embodiments will become apparent to the skilled in the art. Therefore, it is intended that the disclosure be interpreted as covering all such alterations and modifications as fall within the true spirit and scope of the invention.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for processing a stream of tuples comprising:
    a plurality of processing elements to receive a stream of tuples, each processing element having one or more stream operators;
    two or more processors; and
    a memory containing an application that, when executed, causes a processor to:
        receive a stream of tuples to be processed by a plurality of processing elements operating on one or more computer processors, each processing element having one or more stream operators, one or more of the stream operators include code configured to output tuples to one or more other stream operators, the processing elements forming an operator graph in which tuples flow between stream operators, the operator graph defining one or more execution paths for processing and routing the stream of tuples, each processing element having an associated memory space;
        identify a first job, the first job including a first stream operator and a second stream operator, the first stream operator being configured to import a group of tuples from a first data stream and output tuples to the second stream operator;
        identify a second job, the second job including a third stream operator and a fourth stream operator, the third stream operator being configured to import the group of tuples from the first data stream and output tuples to the fourth stream operator;
        determine whether the first stream operator and the third stream operator perform one or more redundant operations on the group of tuples;
        create, in response to the first stream operator and the third stream operator performing one or more redundant operations on the group of tuples, an intermediary stream operator, the intermediary stream operator being configured to perform the one or more redundant operations;
        set the intermediary stream operator as exportable; and
        connect the intermediary stream operator to the first and second jobs.

2. A computer program product for processing a stream of tuples, the computer program product comprising a computer readable storage medium having program code embodied therein, the program code comprising computer readable program code configured to:
    receive a stream of tuples to be processed by a plurality of processing elements operating on one or more computer processors, each processing element having one or more stream operators, one or more of the stream operators include code configured to output tuples to one or more other stream operators, the processing elements forming an operator graph in which tuples flow between stream operators, the operator graph defining one or more execution paths for processing and routing the stream of tuples, each processing element having an associated memory space;
    identify a first job, the first job including a first stream operator and a second stream operator, the first stream operator being configured to import a group of tuples from a first data stream and output tuples to the second stream operator;
    identify a second job, the second job including a third stream operator and a fourth stream operator, the third stream operator being configured to import the group of tuples from the first data stream and output tuples to the fourth stream operator;
    determine whether the first stream operator and the third stream operator perform one or more redundant operations on the group of tuples;
    create, in response to the first stream operator and the third stream operator performing one or more redundant operations on the group of tuples, an intermediary stream operator, the intermediary stream operator being configured to perform the one or more redundant operations;
    set the intermediary stream operator as exportable; and
    connect the intermediary stream operator to the first and second jobs.

* * * * *